(12) United States Patent
Jiang et al.

(10) Patent No.: US 10,243,846 B2
(45) Date of Patent: Mar. 26, 2019

(54) DEFINING ROUTING DOMAIN FOR DISTRIBUTED PACKET PROCESSING

(71) Applicant: Nicira, Inc., Palo Alto, CA (US)

(72) Inventors: Caixia Jiang, Beijing (CN); Jianjun Shen, Beijing (CN); Pankaj Thakkar, Cupertino, CA (US); Anupam Chanda, San Jose, CA (US); Ronghua Zhang, San Jose, CA (US); Ganesan Chandrashekhar, Campbell, CA (US); Vicky Liu, Beijing (CN); Da Wan, Beijing (CN); Frank Pan, Beijing (CN); Hua Wang, Beijing (CN); Donghai Han, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 71 days.

(21) Appl. No.: 15/595,917

(22) Filed: May 15, 2017

(65) Prior Publication Data

US 2018/0331948 A1 Nov. 15, 2018

(51) Int. Cl.
*H04L 12/721* (2013.01)
*H04L 12/46* (2006.01)
*H04L 12/733* (2013.01)

(52) U.S. Cl.
CPC .......... *H04L 45/44* (2013.01); *H04L 12/4633* (2013.01); *H04L 12/4641* (2013.01); *H04L 45/122* (2013.01)

(58) Field of Classification Search
CPC .. H04L 45/44; H04L 12/4633; H04L 12/4641
See application file for complete search history.

(56) References Cited

U.S. PATENT DOCUMENTS

| | | | |
|---|---|---|---|
| 9,755,965 B1 * | 9/2017 | Yadav | ................. H04L 41/0806 |
| 2014/0075002 A1 | 3/2014 | Pradhan et al. | |

(Continued)

OTHER PUBLICATIONS

Guo, Yingya, et al., "Traffic Engineering in SDN/OSPF Hybrid Network," The 22nd IEEE International Conference on Network Protocols (ICNP 2014), Oct. 21-24, 2014, 6 pages, IEEE, The Research Triangle, North Carolina, USA.

(Continued)

*Primary Examiner* — Siming Liu
(74) *Attorney, Agent, or Firm* — Adeli LLP

(57) ABSTRACT

For a managed network including multiple host machines implementing multiple logical networks, some embodiments provide a method that reduces the memory and traffic load required to implement the multiple logical networks. The method generates configuration data for each of multiple host machines including (i) data to configure a host machine to implement a set of logical forwarding elements that belong to a set of routing domains and (ii) identifiers for each routing domain in the set of routing domains. The method then receives data regarding tunnels endpoints operating on each of the host machines and an association with the routing identifiers sent to the host machines. The method then generates a routing domain tunnel endpoint list for each routing domain based on the data received from each of the host machines including a list of the tunnel endpoints associated with the routing domain which the host machines can use to facilitate packet processing.

20 Claims, 11 Drawing Sheets

(56) References Cited

U.S. PATENT DOCUMENTS

2015/0009808 A1    1/2015   Bejerano et al.
2015/0117216 A1    4/2015   Anand et al.
2016/0173338 A1    6/2016   Wolting

OTHER PUBLICATIONS

Jin, Xin, et al., "Dynamic Scheduling of Network Updates," SIGCOMM'14, Aug. 17-22, 2014, 12 pages, ACM, Chicago, IL, USA.

* cited by examiner

DEFINING ROUTING DOMAIN FOR DISTRIBUTED PACKET PROCESSING

BACKGROUND

In current systems, all logical switches connected to a distributed logical router (DLR) (e.g., a tenant logical router (TLR) or provider logical router (PLR)) must be configured on each host machine implementing the distributed logical router. Each machine implementing the distributed logical router reports a tunnel endpoint (e.g., a virtual extensible local area network (VXLAN) tunnel endpoint (VTEP)) to a central control plane (CCP) (e.g., a controller or set of controllers). For a current ARP implementation, each host machine is required to report a <logical switch, VTEP> association (or mapping) for all logical switches connected to the distributed logical router even if the host machine is not hosting any compute nodes connected to a particular logical switch.

In a large-scale virtualized environment, there may be hundreds or even thousands of host machines implementing a same distributed logical router. If the DLR connects to 1000 logical switches, and there are 1000 machines, each machine will have to report 1000 <logical switch, VTEP> associations (or mappings) for a total of 1 million <logical switch, VTEP> associations (or mappings). If each association between a logical switch and a VTEP requires 10 bytes to report, the CCP will have to send ~1 million entries to each of the 1000 host machines for a total of approximately 10 GB of data. Such a large amount of data to send in addition to other control messages is a significant burden on the CCP resources. Each host machine will also receive approximately 10 MB of <logical switch, VTEP> association data which is a significant amount of memory for implementing the distributed logical router.

Additionally, because each VTEP is associated with each logical switch even though the VTEP is not attached to compute nodes belonging to the logical switch it will receive unnecessary broadcast, unknown unicast, and multicast (BUM) traffic.

BRIEF SUMMARY

For a managed network including multiple host machines implementing multiple logical networks, some embodiments provide a method that reduces the memory and traffic load required to implement the multiple logical networks. The method does this by using the concept of a routing domain. A routing domain as used in this disclosure refers to a set of logical forwarding elements (LFEs) (e.g., logical switches and logical routers) that are implemented on each host machine to perform first-hop logical forwarding, examples of routing domains will be provided in FIGS. 2A-D. The method generates configuration data for each of multiple host machines. The configuration data includes (i) data to configure a host machine to implement a set of LFEs that belong to a set of routing domains and (ii) identifiers for each routing domain in the set of routing domains. The method then receives data regarding tunnel endpoints (e.g., virtual extensible local area network (VXLAN) tunnel endpoints (VTEPs)) operating on each of the host machines and an association with the routing identifiers sent to the host machines. The method then generates a routing domain VTEP list for each routing domain based on the data received from each of the host machines. The routing domain VTEP list for a particular routing domain includes a list of the VTEPs associated with the routing domain. In some embodiments, the VTEP list includes addresses for the VTEPs (e.g., IP addresses). The method then sends each routing domain VTEP list to the host machines implementing an LFE for the routing domain. The host machines can then use the routing domain VTEP list to facilitate packet processing (e.g., address resolution protocol (ARP) packets, gratuitous ARP (GARP) packets, etc.).

In some embodiments, the host machines execute managed forwarding elements (MFEs) (e.g., a virtual or software switch, a virtual or software router) that implement LFEs belonging to one or more routing domains. The MFEs are also referred to as physical forwarding elements (PFEs) or managed physical forwarding elements (MPFEs) to distinguish them from the logical forwarding elements that are abstractions used to describe a desired logical network configuration and behavior. These managed physical forwarding elements can be configured to operate in a container, namespace, or virtualization application (e.g., a hypervisor). In some embodiments, the MFEs of each host machine implement distributed LFEs that perform first-hop processing of packets. A routing domain VTEP list is used in some embodiments by a managed physical routing element (MPRE) (e.g., a virtual distributed router) to facilitate packet processing. Facilitating packet processing in some embodiments includes facilitating ARP packet processing by identifying a set of VTEPs to which an ARP request is sent. In some embodiments, the packet processing includes processing GARP packets by identifying the VTEPs to which the GARP packet is sent. In some embodiments, the GARP packet is received by a multicast tunnel endpoint as described in U.S. Pat. No. 9,432,204 which is hereby incorporated by reference.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
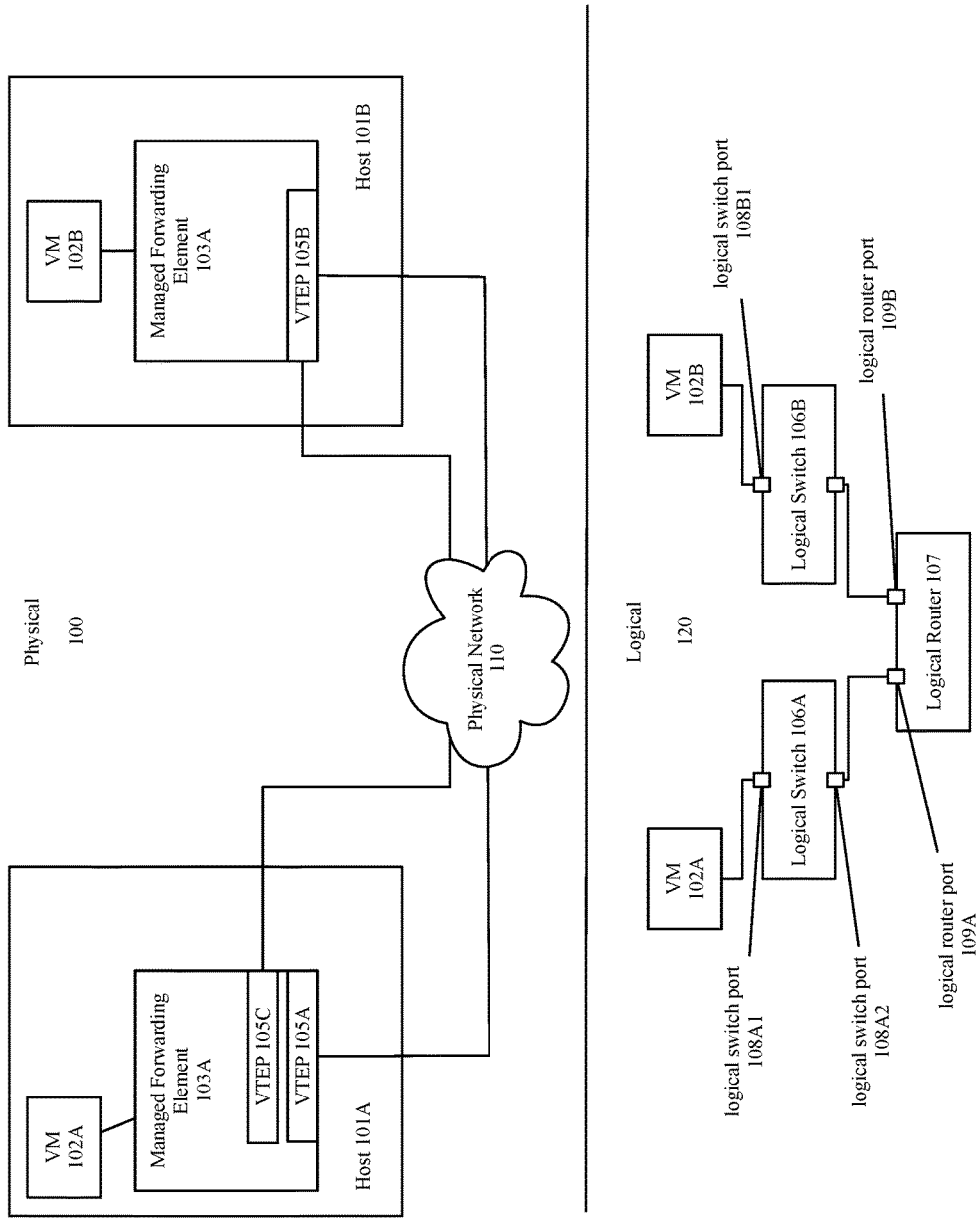
FIG. 1 conceptually illustrates a physical network that includes multiple host machines, physical forwarding elements, VTEPs, and virtual machines that implement an exemplary logical network including multiple logical forwarding elements.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For a managed network including multiple host machines implementing multiple logical networks, some embodiments provide a method that reduces the memory and traffic load required to implement the multiple logical networks. The method does this by using the concept of a routing domain. A routing domain as used in this disclosure refers to a set of logical forwarding elements (LFEs) (e.g., logical switches and logical routers) that are implemented on each host machine to perform first-hop logical forwarding, examples of routing domains will be provided in FIGS. 2A-D. In some embodiments, the method is performed by a central control plane (CCP) (e.g., a controller or set of controllers). The method generates configuration data for each of multiple host machines. The configuration data includes (i) data to configure a host machine to implement a set of LFEs that belong to a set of routing domains and (ii) identifiers for each routing domain in the set of routing domains. The method then receives data regarding tunnel endpoints (e.g., virtual extensible local area network (VXLAN) tunnel endpoints (VTEPs)) operating on each of the host machines and an association with the routing identifiers sent to the host machines. Tunnel endpoints will be referred to as VTEPs for the remainder of the discussion of the embodiments, but one of ordinary skill in the art will understand that they are merely one example of a tunnel endpoint that may be used to implement the invention. The method then generates a routing domain VTEP list for each routing domain based on the data received from each of the host machines. The routing domain VTEP list for a particular routing domain includes a list of the VTEPs associated with the routing domain. In some embodiments, the VTEP list includes addresses for the VTEPs (e.g., IP addresses). The method then sends each routing domain VTEP list to the host machines implementing an LFE for the routing domain. The host machines can then use the routing domain VTEP list to facilitate packet processing (e.g., address resolution protocol (ARP) packets, gratuitous ARP (GARP) packets, etc.).

In addition to the routing domain tunnel endpoint lists, the CCP, in some embodiments, generates local and remote tunnel endpoint lists for LFEs implemented by a particular host used to send broadcast, unknown unicast, and multicast (BUM) packets that are not ARP or GARP packets. In such embodiments, the local and remote lists take up significantly less bandwidth and memory space because they only include those tunnel endpoints executing on host machines that are hosting compute nodes (e.g., VMs) associated with the LFE. These local and remote lists, in some embodiments, are sent as part of the configuration data, while in others they are sent as separate configuration data.

In some embodiments, the VTEP is part of the virtual switch while in other embodiments the VTEP is a separate software entity, but can be thought of as an extension of the virtual switch (e.g., part of an I/O chain between the virtual switch and the physical network interface through which the host machine connects to the physical network of the datacenter). In either case, the VTEPs will be referred to herein as part of the host machine, with the host machine performing the selection of source and destination VTEPs.

As used in this document, the term data packet or packet refers to a collection of bits in a particular format sent across a network. It should be understood that the term data packet or packet may be used herein to refer to various formatted collections of bits that may be sent across a network, such as Ethernet frames, IP packets, TCP segments, UDP datagrams, etc. While the examples below refer to data packets or packets, it should be understood that the invention should not be limited to any specific format or type of data packet. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

FIG. 1 conceptually illustrates a network system 100 in which some embodiments of the invention are implemented. FIG. 1 includes multiple host machines 101, virtual machines (VMs) 102, managed forwarding elements 103, and VTEPs 105. The host machines 101 in some embodiments are connected to each other and additional host machines in network system 100 through a physical network 110. For clarity, FIG. 1 does not illustrate additional elements of the host machines 101 such as hypervisors or additional VMs, but one of ordinary skill in the art would appreciate that the host machines 101 may include such additional elements or multiple elements of the kind shown as single elements in FIG. 1.

FIG. 1 further conceptually illustrates a logical network 120 that is implemented by at least host machines 101A and 101B. Logical network 120 includes logical switch 106A that connects to VM 102A and logical switch 106B that connects to VM 102B. Logical switches 106 represent logical L2 broadcast domains. Logical network 120 also includes a logical router 107 that connects the two logical switches 106 and, through the logical switches 106, the VMs 102.

FIG. 1 also illustrates logical switch ports 108 and logical router ports 109. Logical switch ports 108 are associated with the network addresses of the VMs or logical routers connected to the ports. Similarly, logical router ports 109 are associated with the network addresses of the logical switches and logical routers connected to logical router ports 109.

Logical switches 106 and logical router 107, in some embodiments, are implemented by the managed forwarding elements 103. In some embodiments, logical router 107 is a distributed logical router (DLR). Managed forwarding elements implementing DLRs perform first-hop routing and are also referred to as distributed routers (DRs). DLRs in some embodiments are provider logical routers (PLRs) over which a service provider (e.g., datacenter operator) has full control and that interface directly with an external network. In some embodiments DLRs are tenant logical routers (TLRs) over which a tenant of a datacenter has full control and which connect to at least one PLR for access to external networks. One of ordinary skill in the art would understand that the logical network may contain additional switching and routing elements as well as additional VMs attached to each logical switch, and may be implemented by additional host machines.

In implementing the logical forwarding elements on the physical network 100, some embodiments use at least one VTEP on each host machine to allow tunneling over the physical network 110 between compute nodes on different host machines 101. In embodiments with more than one VTEP on a host, a VTEP used to implement a distributed router is referred to as a distributed router (DR) VTEP. A plurality of DRs belonging to a plurality of routing domains, in some embodiments, will be associated with a plurality of VTEPs executing on the host machine such that each routing domain has one DR VTEP, but at least two routing domains use different VTEPs as DR VTEPs. In some embodiments, host machines terminating tunnels are referred to as transport nodes, however the term transport node may also refer to a hypervisor-implemented virtual switch that acts as the tunnel endpoint. The VTEPs used to implement a particular logical network (e.g., logical network 120) and that therefore need to be aware of each other to process packets for the logical network are used to define a routing domain span as described more fully in relation to FIG. 2.

FIGS. 2A-D conceptually illustrate different routing domains for different conceptually illustrated logical networks. A routing domain defines a routing domain span. A routing domain span includes a set of VTEPs that must be aware of other VTEPs in the set to implement packet processing for the routing domain.

Figure 2A:
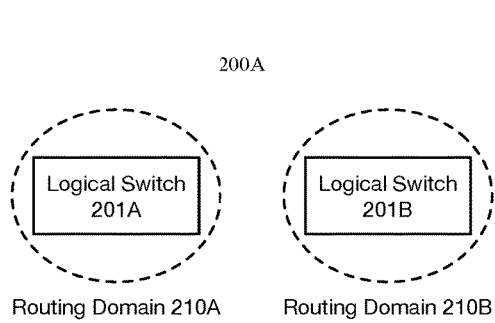
FIGS. 2A-D conceptually illustrate different routing domain spans for different conceptually illustrated logical networks.

FIG. 2A conceptually illustrates, within the dashed ellipses, two routing domains 210A and 210B that each include only a single logical switch 201A and 201B, respectively. To implement packet processing, VTEPs connected to the logical switches 201A and 201B need only be aware of other VTEPs implementing or connected to the single logical switch 201A or 201B respectively.

Figure 2B:
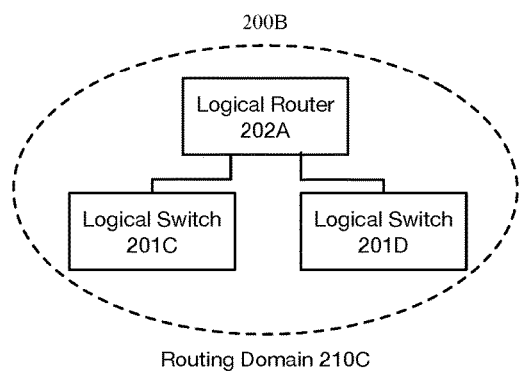

FIG. 2B conceptually illustrates a routing domain 210C that includes two logical switches 201C and 201D connected to a logical router 202A. Logical router 202A in some embodiments is a DLR (e.g., a TLR or PLR). In some embodiments, to implement packet processing, VTEPs connected to the logical switches 201 need to be aware of all other VTEPs implementing (or connected to) both logical switch 201C and 201D. In some embodiments, the need to be aware of all VTEPs in the routing domain arises because in order to process an ARP request, a sending logical router must send the ARP to all the VTEPs in the routing domain, however, if the packet that necessitated the ARP packet was sent from a VM connected to logical switch 201C and the MFE implementing logical switch 201C was only aware of the other VTEPs on logical switch 201C the ARP would not be able to reach the VMs on logical switch 201D that may possess the requested destination IP address.

Figure 2C:
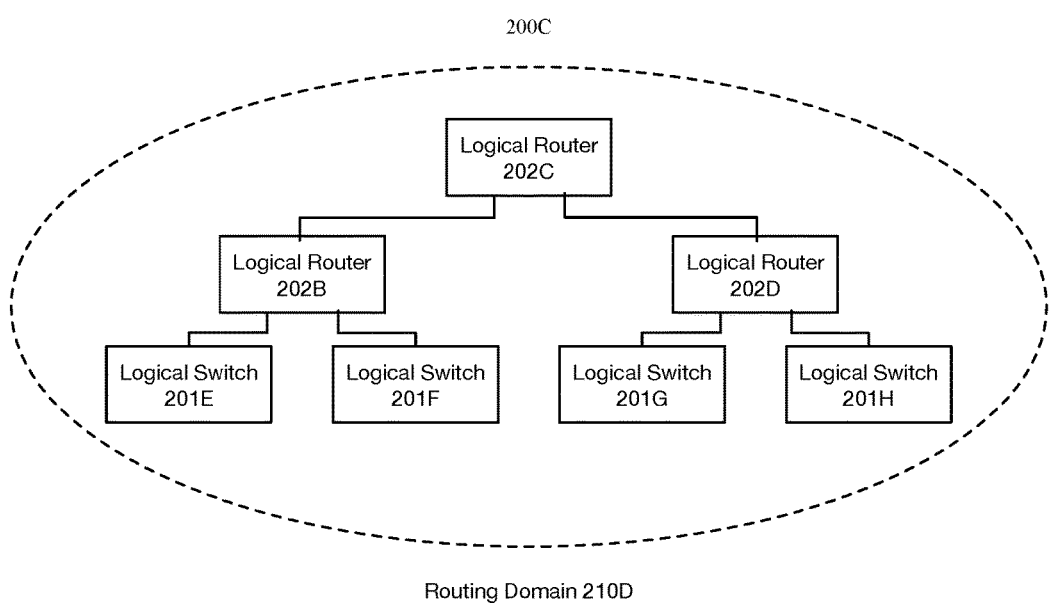

FIG. 2C conceptually illustrates a routing domain 210D that includes two logical switches 201E and 201F connected to a logical router 202B and two logical switches 201G and 201H connected to a logical router 202D. FIG. 2 further illustrates that logical routers 202B and 202D connect to logical router 202C. Logical routers 202B and 202D in some embodiments are TLRs while logical router 202C is a PLR. In other embodiments, the logical routers 202 are all TLRs. One of ordinary skill in the art understands that TLRs and PLRs are merely used as examples of distributed logical routers that perform first-hop routing and that logical routers 202 in some embodiments are any type of distributed logical router.

Figure 2D:
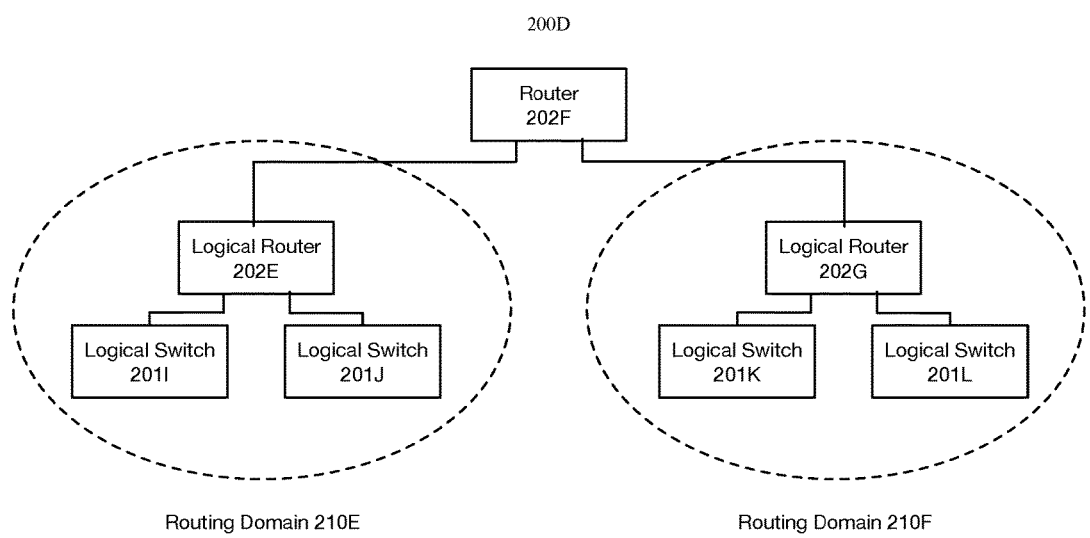

FIG. 2D conceptually illustrates routing domains 210E and 210F each of which includes two logical switches, logical switches 201I and 201J and logical switches 201K and 201L, respectively. Logical switches 201I and 201J are connected to logical router 202E and logical switches 201K and 201L are connected to logical router 202G. FIG. 2 further illustrates that logical routers 202E and 202G connect to router 202F. Logical routers 202E and 202G in some embodiments are DLRs while router 202F is a physical or logical router that does not support first-hop routing (i.e., router 202F is not a distributed router).

Figure 3:
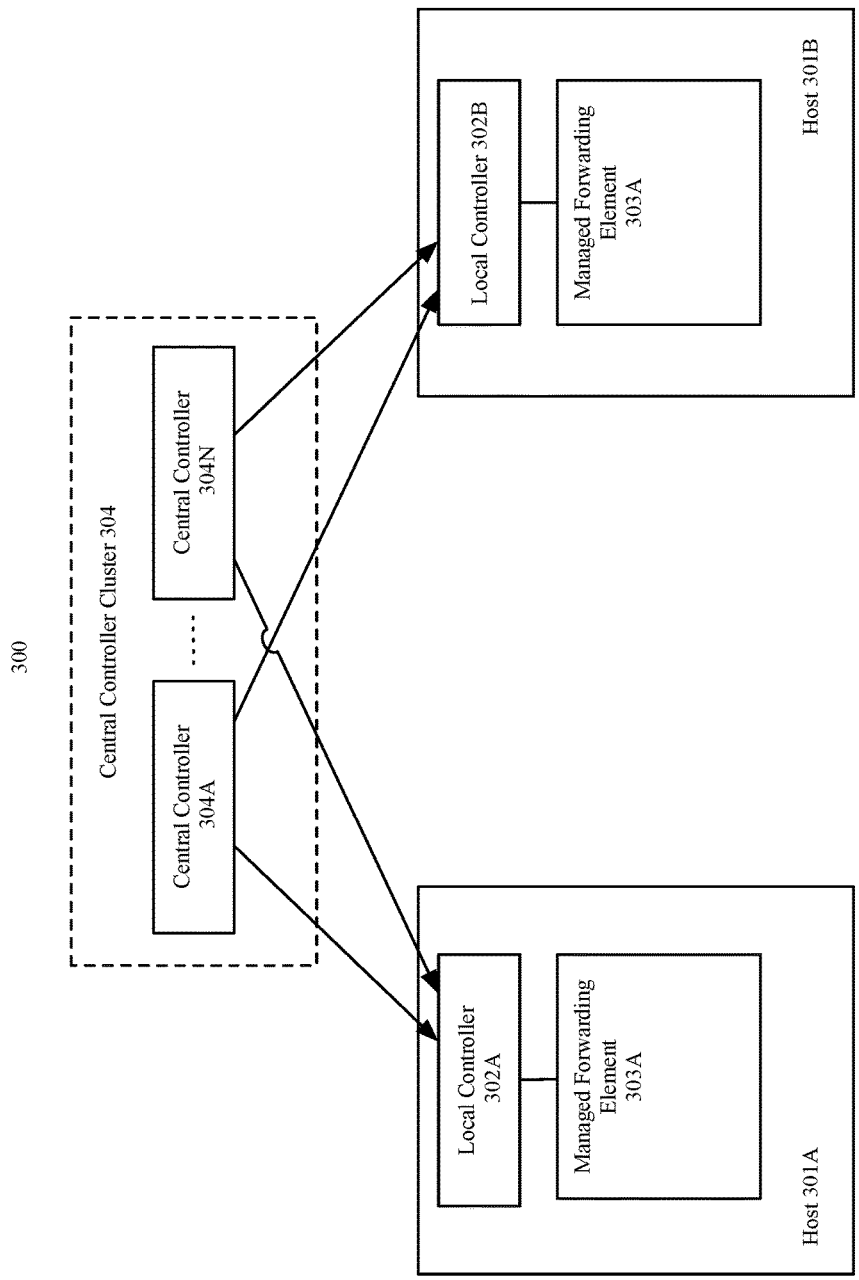
FIG. 3 illustrates a simplified view of a network for providing control data to implement LFEs.

FIG. 3 illustrates a simplified view of a network control system 300 for providing control data to implement a set of LFEs. The network control system 300 in some embodiments includes central controller 304 (e.g., a single central controller, a central controller cluster). The central controller 304 (also referred to as a central control place (CCP)) communicates with local controllers 302 to provide data used to configure managed forwarding elements 303 executing on host machines 301 to implement logical forwarding elements.

A local controller 302, in some embodiments, operates on each host machine, for the purpose of communicating with the central controller 304 (or one or more central controllers of a cluster) to receive configuration information for the MFE(s) on its host machine. The local controller 302 of some embodiments translates the configuration data into a format readable by its local MFE 303, and uses the translated data to configure the MFE. In addition, in some embodiments, the local controllers communicate with the central controller to exchange the VTEP, logical switch, and routing domain information described below.

Figure 4:
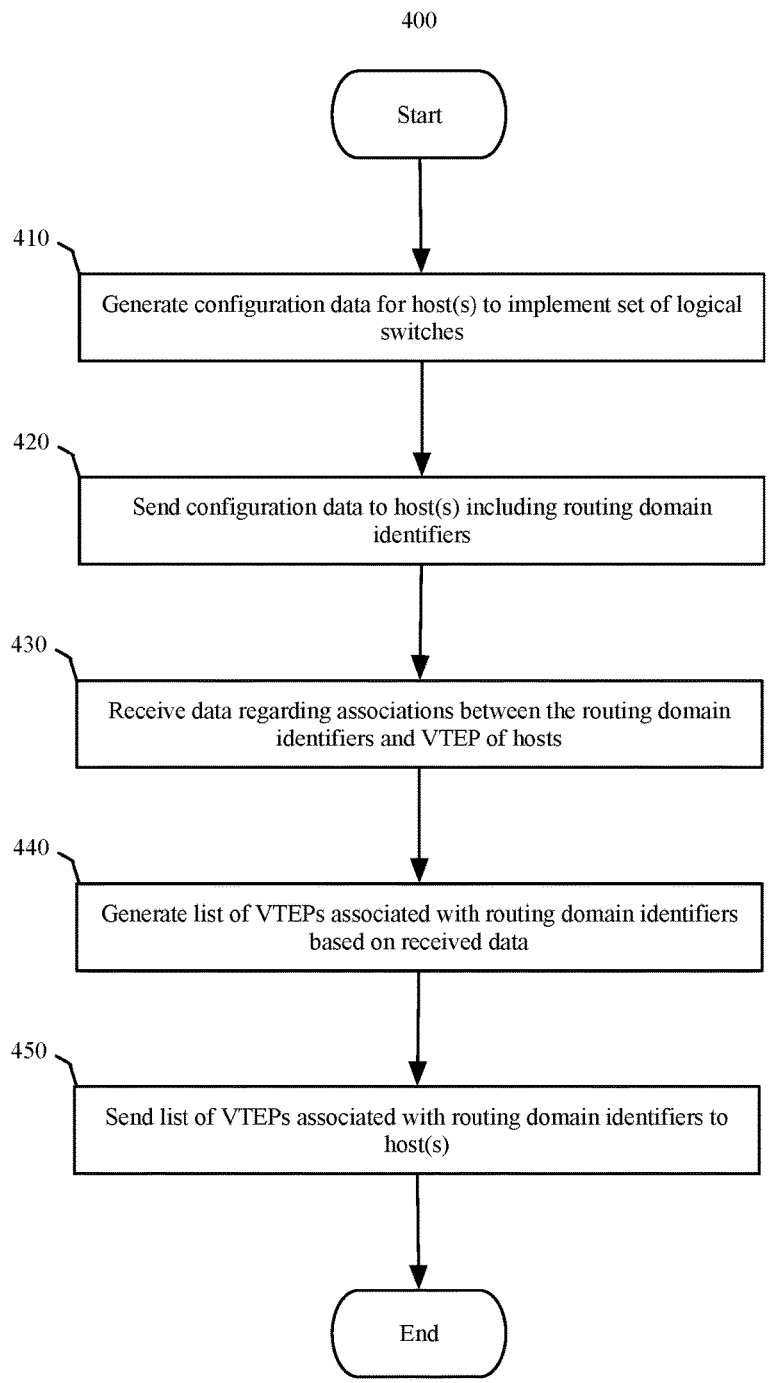
FIG. 4 conceptually illustrates a process of some embodiments for configuring host machines with routing domain VTEP lists.

FIG. 4 conceptually illustrates a process 400 of some embodiments for configuring host machines (e.g., MFEs executing on host machines) to implement logical forwarding elements and routing domain VTEP lists. In some embodiments, process 400 is performed by central control plane (CCP) 304. The process begins (at 410) by generating configuration data for host machines implementing a set of logical forwarding elements (LFEs). The configuration data in some embodiments includes configuration data for the LFEs that the host machine will implement as well as routing domain identifiers for the routing domains to which the LFEs belong. The routing domains in some embodiments are unique routing domain identifiers generated as part of the configuration process. In some embodiments, the configuration data will further include pairings between the LFEs and the routing domain identifiers (e.g., <routing domain ID 1, LFE A> or <routing domain ID 1; LFE A, LFE C, LFE J>). Each host machine implements all logical switches to which a VM executing on the host machine connects as well as all distributed logical routers to which the logical switches connect. In some embodiments, a host machine will not implement a logical switch for which it does not host connected VMs. In some embodiments, sets of LFEs implemented on the host machine belong to different routing domains (e.g., in FIG. 6 transport node 603B will implement logical switch 601B and logical router 602A in routing domain 610A as well as logical switch 601C and logical router 602B in routing domain 610B).

The process continues (at 420) by sending the configuration data to the hosts, including the routing domain identifiers for each LFE that the host machine will implement. The configuration data in some embodiments will define the forwarding behavior of the LFEs to be implemented by a managed forwarding element (e.g., a virtual switch or virtual router) of the host machine.

The process then continues (at 430) by receiving, from the host machines, data identifying associations between the VTEPs executing on the host machines and the routing domain identifiers sent as part of the configuration data. In some embodiments, the host machines send a separate association between the VTEP executing on the host machine and the routing domain identifier for each routing domain identifier provided.

The process then calculates a routing domain span and generates (at 440) lists of VTEPs associated with each routing domain that can be used by the host machines to facilitate packet processing. Each list includes a routing domain ID along with multiple VTEP identifiers. In some embodiments, the VTEP identifiers are addresses of the VTEPs (e.g., IP addresses). A list of logical switches included in the routing domain is also generated in some embodiments. In some embodiments, the process generates separate lists for each host machine listing only VTEPs on other hosts (i.e., a remote VTEP list), while in other embodiments the process generates lists that include all VTEPs associated with a routing domain which the individual host machines will separate into lists of local and remote VTEPs for each routing domain. After the lists are generated, the process sends to each host machine (at 450) the lists of VTEPs associated with the routing domain or domains implemented by the host. In some embodiments, the sent list also includes the list of logical switches included in the routing domain. The process then ends.

This method reduces the traffic and memory load on the network elements (for example, the CCP and the host machines). For example, if a system includes 1000 logical switches, 10 routing domains, and 1000 host machines (e.g., transport nodes) the VTEP replication number (e.g., the number of entries in the routing domain VTEP lists) is 10*1000=10,000 if all transport nodes join all routing domains. This requires only 100 MB of data to be transferred by the process to the host machines (transport nodes) and 100 KB to be stored on each host machine.

A person of ordinary skill in the art will appreciate that parts of this process or the whole process are performed multiple times, in part or in whole, based on changes to the definition of the logical network (e.g., the addition of a logical switch, logical router, virtual machine, etc.) or the underlying physical network (e.g., failure of a host, migration of a virtual machine, failure of an MFE, etc.).

Figure 5:
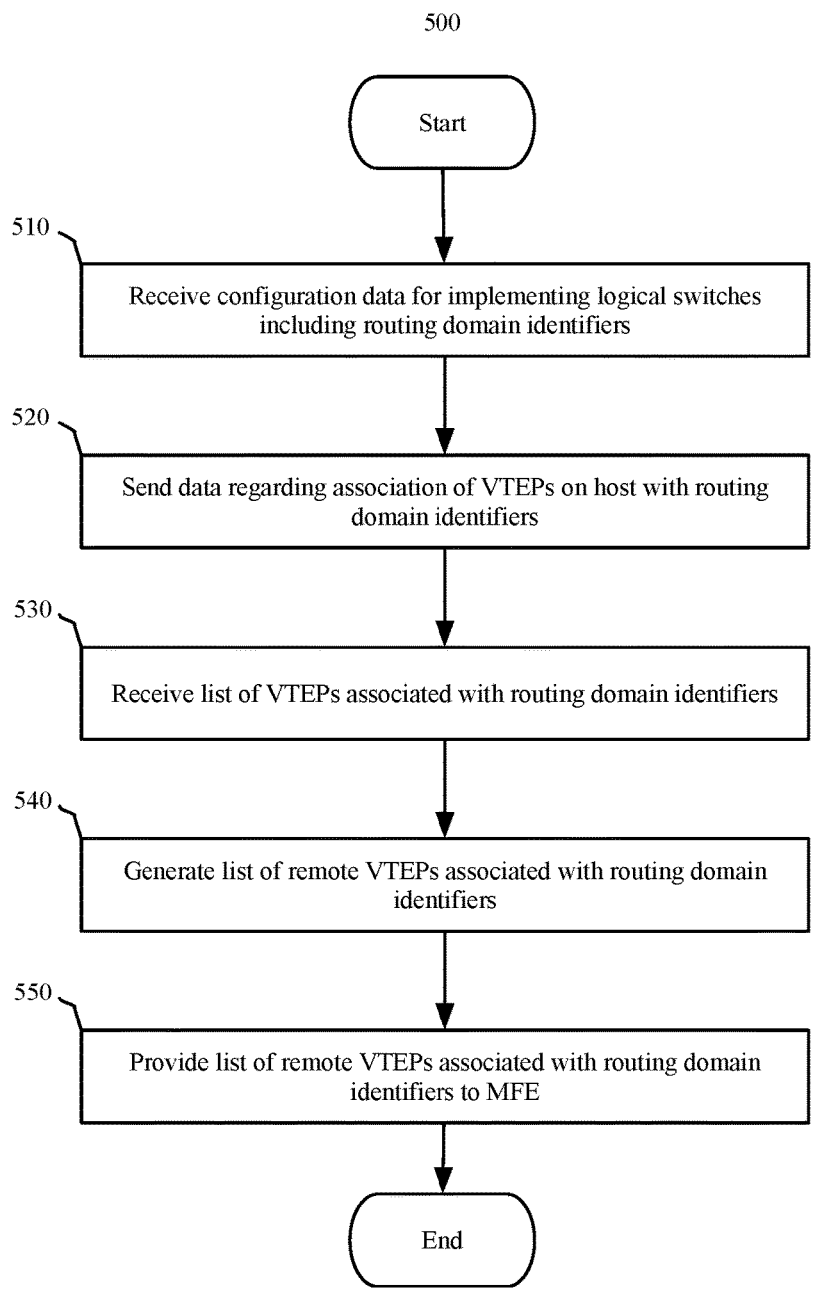
FIG. 5 conceptually illustrates a process of some embodiments for using a routing domain VTEP list to perform packet processing.

FIG. 5 conceptually illustrates a process to configure an MFE executing on a host machine to implement packet processing according to some embodiments. In some embodiments, the process is performed by a local controller on a host that executes an MFE to implement logical processing of packets. The process begins (at 510) by receiving configuration data for implementing LFEs and identifying the routing domains to which the LFEs belong. The configuration data in some embodiments includes data regarding the different compute nodes (e.g., virtual machines, containers, etc.) connected to the LFEs and the interconnections between the different LFEs (e.g., logical switch 201C is connected to logical router 202A, etc.).

The process then sends (at 520) data back to the configuration data source (e.g., a CCP) regarding the association between the routing domains implemented on the host machine and the VTEP (or VTEPs) operating on the host. In some embodiments, only DR VTEPs (i.e., VTEPs being used to implement a distributed router) are reported to the configuration data source.

The process then receives (at 530) the list of routing domain identifiers and the associated VTEPs for each routing domain. In some embodiments, the received list of routing domain identifiers and associated VTEPs also includes a list of logical switches associated with the routing domain identifiers. In some embodiments, the received list of routing domain identifiers and associated VTEPs includes the local VTEP (or VTEPs) of the host. In other embodiments, the received list of routing domain identifiers and associated VTEPs includes only those VTEPs executing on other host machines.

The process (at 540) generates a list of remote VTEPs from the received list that excludes the local VTEP (or VTEPs). In some embodiments, the remote VTEP list includes a list of logical switches associated with a routing domain as well as a separate list of VTEPs associated with the routing domain.

The process then sends (at 550) the generated list of remote VTEPs to the MFE to use in packet processing for packets belonging to the routing domain. The MFE is then ready to use the list to implement packet processing and the process ends.

Figure 6:
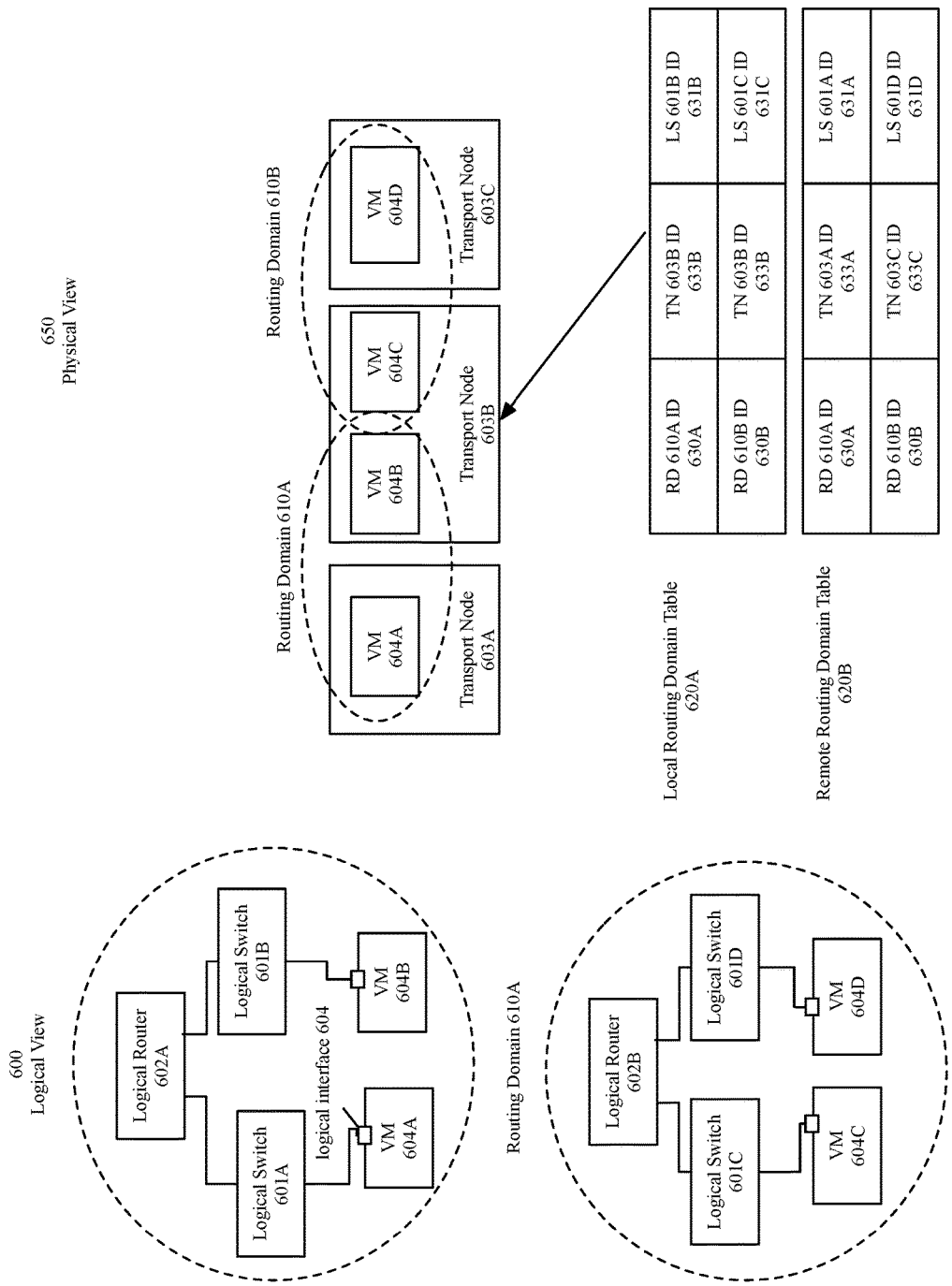
FIG. 6 illustrates a set of routing domain tables for a host machine acting as a transport node.

FIG. 6 conceptually illustrates a logical view 600 and a physical view 650 of a system in which some embodiments are implemented. Logical view 600 includes two routing domains 610 each connecting a set of two virtual machines (VMs) 604. Each VM connects to one logical switch 601 and through a logical router 602 to another logical switch 601.

Physical view 650 illustrates that the VMs for the two routing domains execute on a set of three transport nodes (e.g., host machines executing VTEPs) 603. Specifically, the physical view 650 illustrates that VMs belonging to two separate routing domains execute on a single transport node 603B. The physical view 650, does not show elements understood to be present in a transport node such as a VTEP or MFE or elements of the physical network connecting the transport nodes such as, for example, physical switches and routers. As such, physical view 650 does not represent an actual physical view of the network, but rather is used to illustrate that a single transport node, in some embodiments, executes VMs belonging to a plurality of routing domains.

Additionally, FIG. 6 conceptually illustrates a set of routing domain tables for transport node 603B. In some embodiments, the routing domain tables include (1) a local routing domain table 620A identifying the VTEP on the host machine (using transport node identifiers 633) as being associated with routing domains (using routing domain identifiers 630) and LFEs (using, for example, logical switch identifiers 631) connected to the VTEP and (2) a remote routing domain table 620B identifying the other VTEPs associated with the routing domains and LFEs connected to the other VTEPs. In some embodiments, only a routing domain ID 630 and transport node identifiers 633 are included in the routing domain tables. Because transport node 603B executes two VMs belonging to two separate routing domains, transport node 603B has entries for both routing domains in local routing domain table 620A and remote routing domain table 620B.

In some embodiments, the local and remote routing domain tables 620A and 620B include separate entries for logical switch identifiers 631 and transport node identifiers 633 associated with the routing domain identifier 630.

Figure 7:
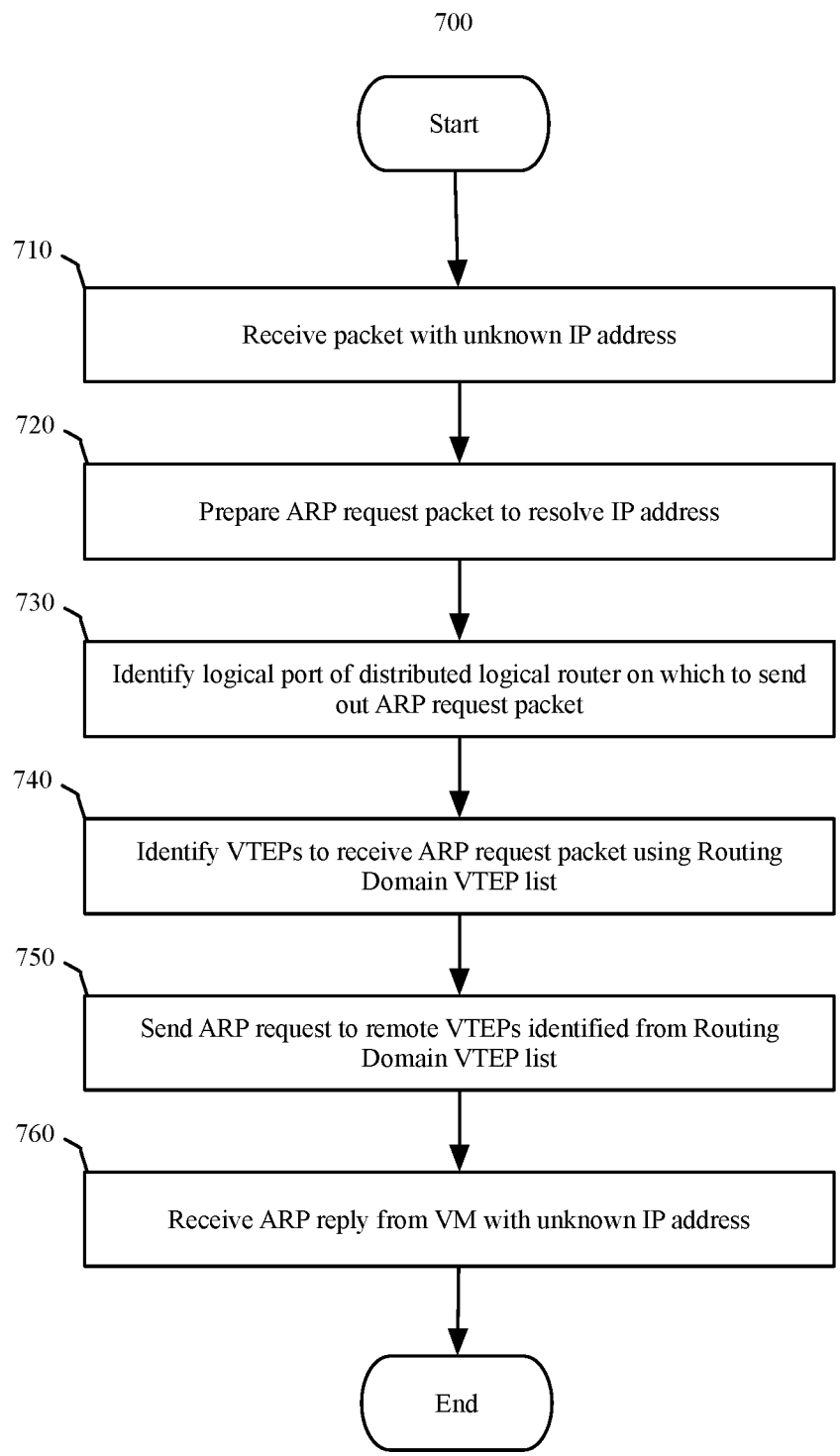
FIG. 7 conceptually illustrates a process of some embodiments for performing ARP packet processing using the routing domain VTEP list.

FIG. 7 conceptually illustrates a process used by a host machine that receives a packet with an IP address for an unknown destination compute node (e.g., a VM or container executing on another host). Process 700 begins (at 710) when the host machine (or virtual router implementing a DLR that executes on the host) receives a packet for which it does not know a MAC address of a next-hop in the logical network. The rest of the discussion will refer to the host machine as performing the steps of the process, but one of ordinary skill in the art will understand that an MFE executing on the host machine or some other module performs the steps in some embodiments.

The process continues by having the host machine (at 720) prepare an address resolution protocol (ARP) request packet to resolve the unknown IP address into a MAC address for a logical next-hop for packets with the unknown IP address. The ARP request packet in some embodiments is prepared as part of the implementation of a managed physical routing element acting as a distributed router executing on the host.

The host machine then identifies (at 730) the logical port out of which it sends the ARP request packet. In some embodiments, this identification is made based on the destination IP address and the IP subnets of the connected logical switches.

The host machine, in some embodiments, then identifies (at 740) the VTEPs connected to the logical port (i.e., the logical switching element) using the routing domain VTEP list. In some embodiments, the identified VTEPs for the logical switching element include all VTEPs in the routing domain VTEP list (e.g., all the VTEPs in the routing domain other than the VTEP on the host machine). In other embodiments, the identified VTEPs for a logical switching element include only those VTEPs that are on machines executing destination compute nodes (e.g., VMs, containers, etc.) connected to the logical switch, when the host machine implements the logical switch, but when the host machine does not implement the logical switch will include all the VTEPs in the routing domain list. For example, identified VTEPs for a logical switching element implemented by the host machine include only those VTEPs identified in a remote VTEP list for the particular logical switch, while identified VTEPs for a logical switching element not implemented by the host machine include all VTEPs in the routing domain. An ARP packet in some embodiments includes the IP address and MAC address of the distributed router (e.g., the managed routing element executing on the host machine) in the sender fields and the IP address of the destination address in the target protocol address field, leaving the target MAC address blank as it is unknown. In some embodiments, the MAC address of the distributed router is a virtual MAC address that is replaced with a physical MAC address of the host machine before the ARP packet is sent out over the network.

Once VTEPs have been identified, the process (at 750) sends the ARP request packet to the identified remote VTEPs. In some embodiments, each ARP packet is sent as a tunneled packet using a VXLAN network identifier (VNI) in addition to a source and destination IP address for the source and destination VTEPs respectively.

The process then receives (at 760) an ARP reply packet identifying the MAC address of the next-hop for the unknown IP address. In some embodiments, the next-hop address is the MAC address of the destination compute node. The process then ends.

Figure 8:
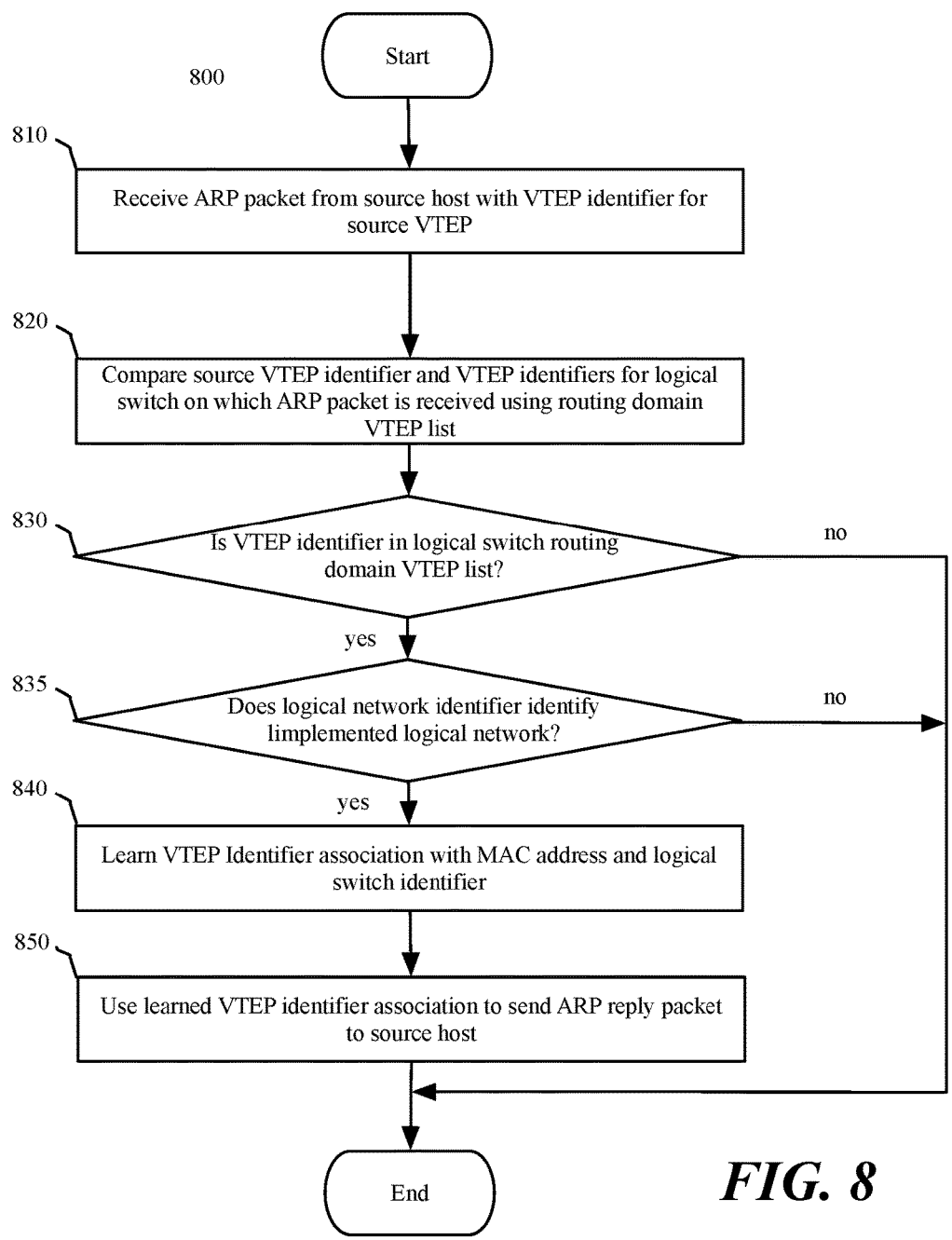
FIG. 8 conceptually illustrates a process of some embodiments for processing a received ARP request packet.

FIG. 8 conceptually illustrates a process performed by a host machine that receives the ARP request packet over a particular logical forwarding element (e.g., a logical switch). In some embodiments, a logical forwarding element identifier (e.g., a virtual network identifier (VNI)) is included in a tunneled packet to identify the particular logical forwarding element. The process begins (at 810) when the host machine receives an ARP request packet at a VTEP executing on the host machine. The ARP packet in some embodiments is encapsulated as a VXLAN packet with a VNI that identifies the particular logical network (e.g., logical switch) to which the packet belongs. In some embodiments, the source VTEP is identified in the packet (e.g., by a source VTEP IP address).

The host machine (at 820) then compares the VNI and the VTEP identifier, which in some embodiments is the VTEP IP address, to the list of VTEP identifiers for the routing domain to which the particular logical network belongs.

If the process determines (at 830) that the VTEP identifier is not included in the routing domain VTEP list for the particular logical network, the host machine does not learn an association between the sender VTEP identifier and the MAC address and logical network identifier, the packet is dropped and the process ends. On the other hand, if the process determines (at 830) that the VTEP identifier is included in the routing domain VTEP list, the receiving host machine then determines (at 835) whether the receiving host machine implements the logical network (e.g., logical switch) identified by the logical network identifier. If the process determines (at 835) that the receiving host machine does not implement the identified logical network, the host machine drops the packet and the process ends. But, if the process determines (at 835) that the receiving host machine implements the particular logical network, the host machine learns (at 840) the association between the VTEP identifier, the MAC address, and the logical network.

If the host machine is hosting the data compute node that has the destination IP address, a reply packet is sent from the destination compute node back to the source of the ARP request packet. In some embodiments, the MFE executing on the host machine acts an ARP proxy as described in U.S. Pat. No. 9,575,782 which is hereby incorporated by reference. In embodiments including an ARP proxy, the MFE executing on the host machine replies to ARP requests when it stores the MAC address associated with the IP address in the ARP request. The host machine (at 850) then uses the learned association between the VTEP identifier, the MAC address, and the logical network to send a unicast packet back to the source host machine and the process ends.

Figure 9A:
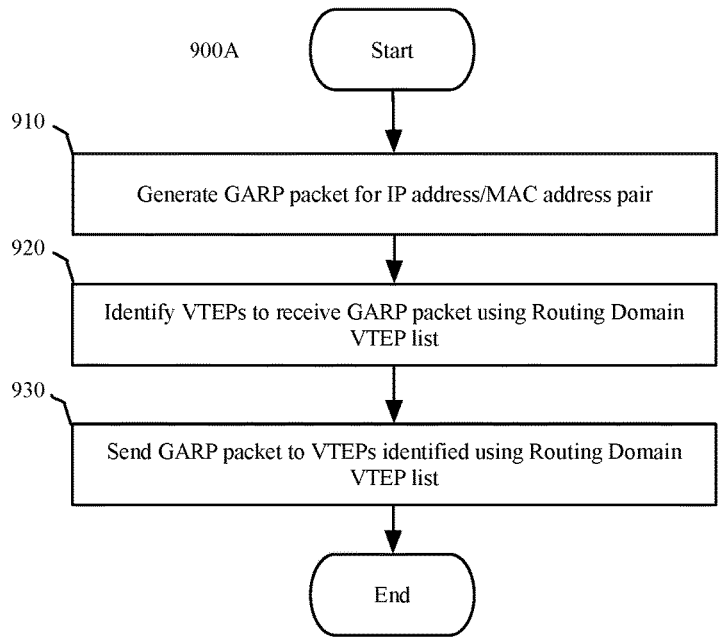
FIGS. 9A-B conceptually illustrate a process of some embodiments for processing GARP packets.
Figure 9B:
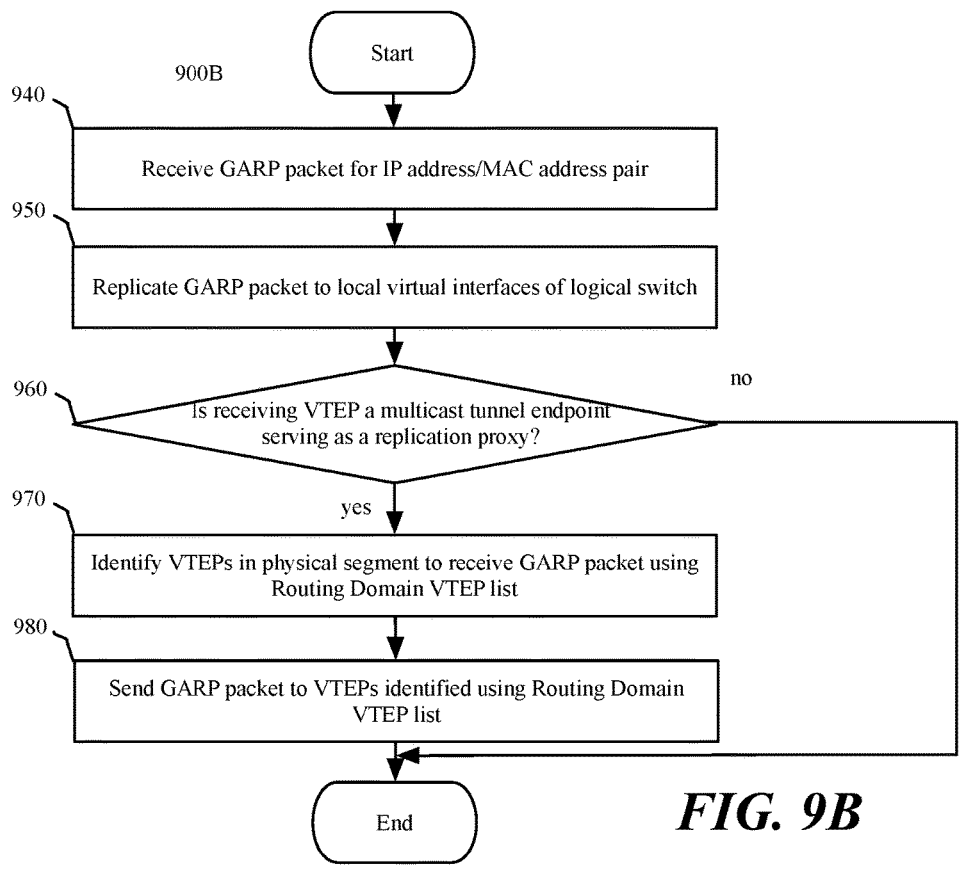

FIGS. 9A-B conceptually illustrate processes performed in some embodiments by host machines sending and receiving gratuitous ARP (GARP) packets, respectively. FIG. 9A conceptually illustrates a process performed by a host machine sending a GARP packet for a compute node or LFE executing on the host. The process begins (at 910) when a GARP packet is generated to advertise a MAC address at a particular IP address. In some embodiments, a GARP packet is sent as an ARP request packet that identifies the source's MAC address in the sender link-layer address field (leaving the target link-layer field empty) and the source's IP address in both the sender and target protocol address field. In other embodiments, the GARP packet is sent as an ARP reply packet that identifies the source's MAC address in both the sender and target link-layer address field and the source's IP address in both the sender and target protocol address fields.

The process continues (at 920) by identifying the VTEPs that should receive the GARP packet. In some embodiments, the identified VTEPs include multicast tunnel endpoints that serve as replication proxies for other segments of the logical or physical network as described in U.S. Pat. No. 9,432,204 which is hereby incorporated by reference. The process continues (at 930) by sending the GARP packet to the identified VTEPs. In some embodiments, the identified VTEPs include all the VTEPs in the routing domain VTEP list maintained by the host machine. In some embodiments, sending the GARP packet to the identified VTEPs includes sending the GARP packet to a multicast tunnel endpoint which serves as a proxy for replicating packets to a subset of the identified VTEPs.

FIG. 9B conceptually illustrates a process performed by a host machine that receives a GARP packet. The process begins (at 940) when a host machine receives a GARP packet. The process continues (at 950) with the host machine replicating the GARP packet to the compute nodes connected to the LFEs over which the GARP packet was broadcast as well as the MFE implementing the logical router. In some embodiments, the MFEs implementing the LFEs that are involved in the transmission of the GARP packet learn the association between the MAC address and the IP address contained in the GARP packet.

In embodiments using multicast tunnel endpoints as replication proxies, the process continues (at 960) by determining whether the receiving host machine (or VTEP of the host) is a replication proxy for a particular logical or physical network segment. If the host machine (or VTEP) is a replication proxy for a particular logical network segment on which the GARP packet was received, it identifies the VTEPs for which it needs to perform source replication using the routing domain VTEP list. In some embodiments, the routing domain VTEP list is used to identify the VTEPs that are in the same physical network segment as the receiving host machine (or VTEP) and are included in the routing domain span of the logical segment on which the GARP packet was received. In some embodiments, a separate replication VTEP list is maintained to identify VTEPS for which the VTEP must replicate multicast or broadcast packets.

The process (at 970) sends the replicated GARP packet to the identified VTEPs. After the replicated packet is sent to the identified VTEPs (at 980) or the host machine is determined to not be a replication proxy (at 960), the process ends.

Figure 10:
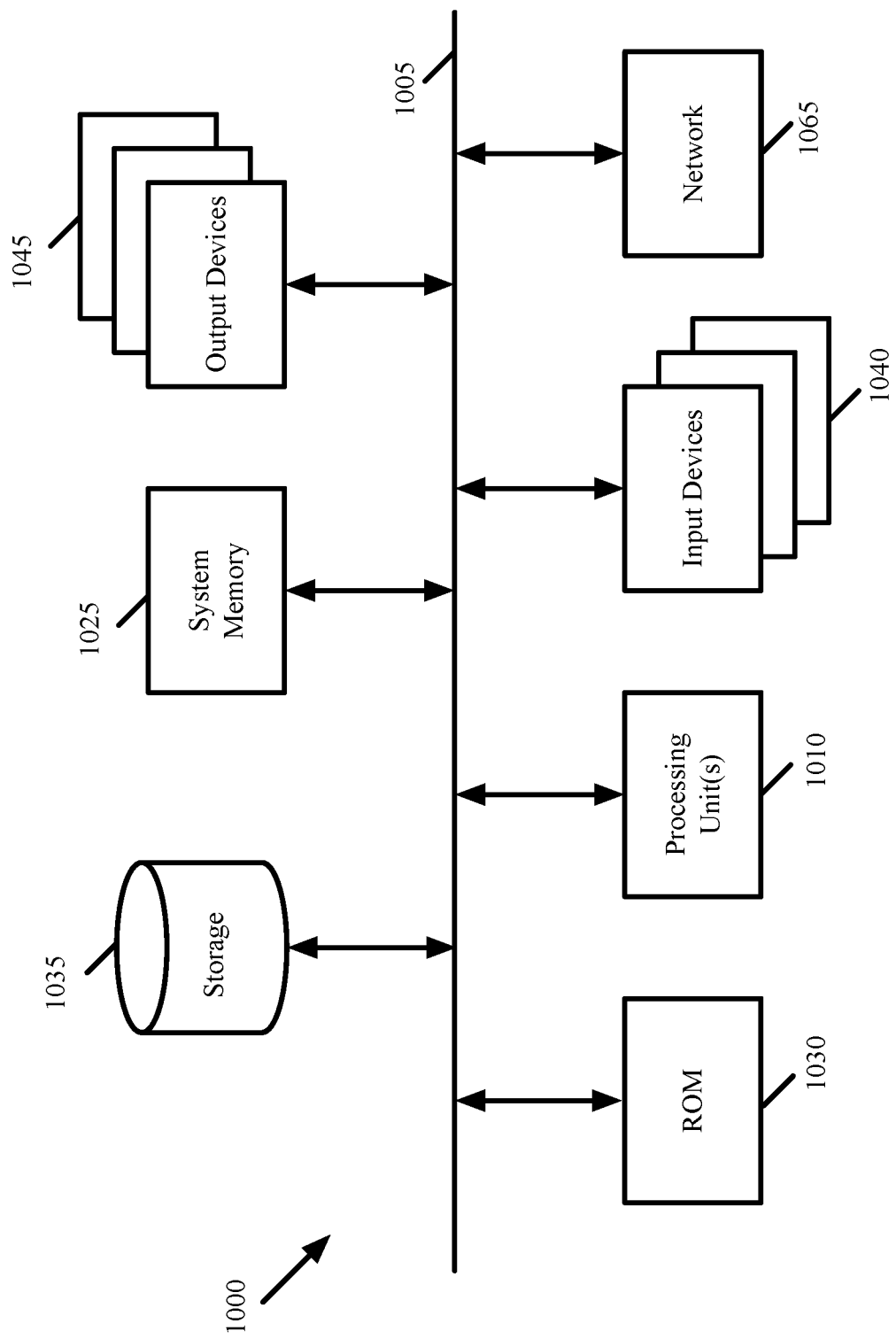
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such as random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4, 5, 7, 8, and 9A-B) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for facilitating implementation of logical routing by a plurality of managed forwarding elements (MFEs), the method comprising:
   generating configuration data for configuring a particular MFE of the plurality of MFEs to implement a set of logical switches belonging to a set of routing domains, the configuration data comprising a unique identifier for each routing domain, wherein each MFE of the plurality of MFEs comprises at least one tunnel endpoint;
   from each MFE of a set of the plurality of MFEs, receiving data regarding associations between routing domain identifiers and tunnel endpoints of the MFE;
   based on the received data, generating, for each routing domain in the set of routing domains, a list of the tunnel endpoints associated with the routing domain; and
   sending the list for each routing domain in the set of routing domains to the particular MFE to facilitate packet processing.

2. The method of claim 1, wherein the particular MFE comprises a plurality of tunnel endpoints,
   wherein a first tunnel endpoint of the MFE is associated with a first routing domain identifier, and
   wherein a second tunnel endpoint of the MFE is associated with a second routing domain identifier.

3. The method of claim 1, wherein the data regarding associations between routing domain identifiers and tunnel endpoints of each MFE is received from a local controller executing on a same host machine as the MFE.

4. The method of claim 1, wherein the MFE uses the list sent for a particular routing domain to facilitate Address Resolution Protocol (ARP) packet processing.

5. The method of claim 4, wherein using the list sent for the particular routing domain comprises:
   using the list to identify a set of tunnel endpoints at a set of other MFEs in the plurality of MFEs that are in the particular routing domain; and
   sending out an ARP packet to the identified set of tunnel endpoints.

6. The method of claim 5, wherein the ARP packet is one of an ARP request packet and a gratuitous ARP (GARP) packet.

7. The method of claim 1, wherein the tunnel endpoints are virtual extensible local area network (VXLAN) tunnel endpoints (VTEPs).

8. The method of claim 1, wherein facilitating packet processing comprises comparing tunnel endpoint identifiers in the list for a particular routing domain to a tunnel endpoint identifier received as part of a particular ARP packet for the particular routing domain to determine whether the association between the tunnel endpoint identifier and a MAC address associated with the particular ARP packet will be learned by the MFE.

9. The method of claim 8, wherein the association between the tunnel endpoint identifier and the MAC address associated with the particular ARP packet is learned only if the tunnel identifier matches a tunnel identifier in the list sent for the particular routing domain.

10. The method of claim 9, wherein the learned association between the tunnel endpoint identifier and the MAC address associated with the particular ARP packet is used to send an ARP reply packet as a unicast packet.

11. A method for implementing logical routing, at a managed forwarding element (MFE) of a plurality of MFEs, the method comprising:
   receiving, from a network controller, configuration data for implementing a set of logical switches belonging to a set of routing domains, the configuration data comprising a unique identifier for each routing domain in the set of routing domains;
   sending to the network controller associations between the routing domain identifiers and tunnel endpoints of the MFE;
   for each routing domain in the set of routing domains, receiving, from the network controller, a list that specifies the tunnel endpoints of the plurality of MFEs that are associated with the routing domain; and
   wherein the received lists are used by the MFE for processing packets for the set of routing domains.

12. The method of claim 11, wherein the MFE comprises a plurality of tunnel endpoints,
   wherein a first tunnel endpoint of the MFE is associated with a first routing domain identifier, and
   wherein a second tunnel endpoint of the MFE is associated with a second routing domain identifier.

13. The method of claim 11, wherein the method is performed by a local controller executing on a same host machine as the MFE, the method further comprising providing the received lists to the MFE.

14. The method of claim 13, wherein the MFE uses the list sent for a particular routing domain to facilitate ARP packet processing.

15. The method of claim 14, wherein using the list sent for the particular routing domain comprises:
   using the list to identify a set of tunnel endpoints at a set of other MFEs in the plurality of MFEs that are in the particular routing domain; and
   sending out an ARP packet to the identified set of tunnel endpoints.

16. The method of claim 15, wherein the ARP packet is one of an ARP request packet and a gratuitous ARP (GARP) packet.

17. The method of claim 11, wherein the tunnel endpoints are virtual extensible local area network (VXLAN) tunnel endpoints (VTEPs).

18. The method of claim 11, wherein using the received lists for packet processing comprises comparing tunnel endpoint identifiers in the list for a particular routing domain to a tunnel endpoint identifier received as part of a particular ARP packet for the particular routing domain to determine whether the association between the tunnel endpoint identifier and a MAC address associated with the particular ARP packet will be learned by the MFE.

19. The method of claim 18, wherein the association between the tunnel endpoint identifier and the MAC address associated with the particular ARP packet is learned only if the tunnel identifier matches a tunnel identifier in the list sent for the particular routing domain.

20. The method of claim 19, wherein the learned association between the tunnel endpoint identifier and the MAC address associated with the particular ARP packet is used to send an ARP reply packet as a unicast packet.

* * * * *